Figure 1:
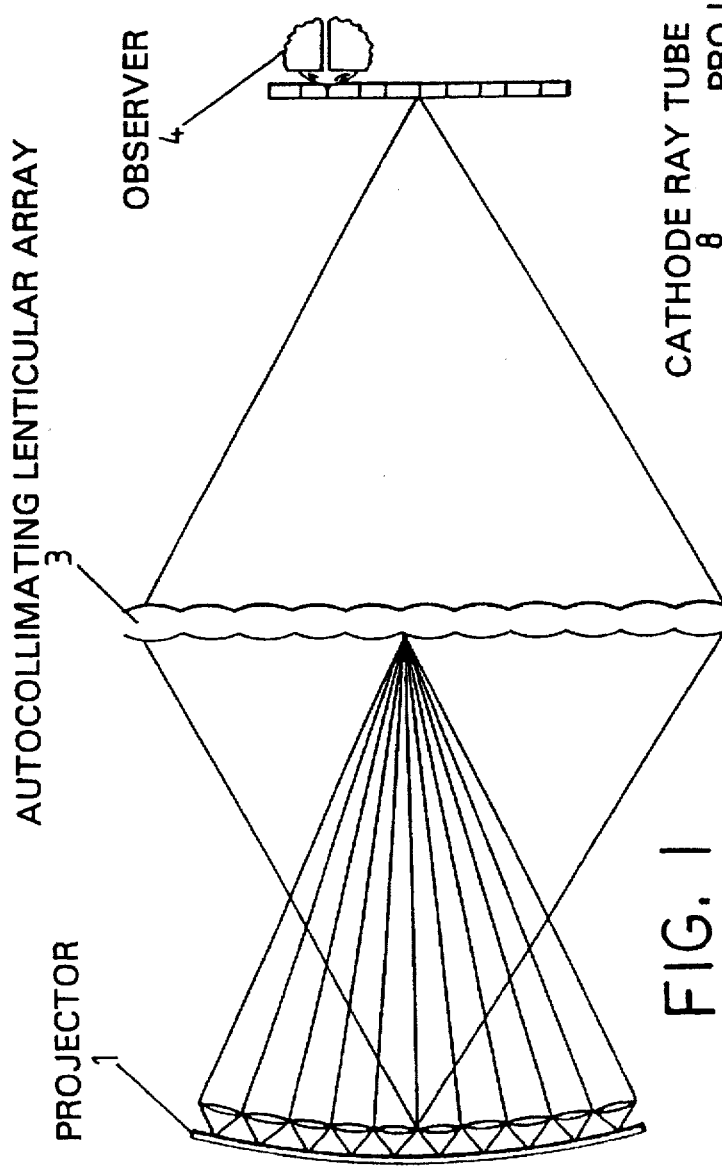

United States Patent [19]
Ezra et al.

[11] Patent Number: 5,703,717
[45] Date of Patent: Dec. 30, 1997

[54] THREE-DIMENSIONAL PROJECTION DISPLAY APPARATUS

[75] Inventors: David Ezra; Graham John Woodgate; Jonathan Harrold; Basil Arthur Omar, all of Oxfordshire, United Kingdom

[73] Assignee: Sharp Kabushiki Kaisha, Osaka, Japan

[21] Appl. No.: 337,932

[22] Filed: Nov. 10, 1994

[30] Foreign Application Priority Data

Nov. 12, 1993 [GB] United Kingdom ............ 9323402

[51] Int. Cl.$^6$ ............ G02B 27/22; H04N 13/00
[52] U.S. Cl. ............ 359/462; 359/463; 359/623; 348/54; 348/59
[58] Field of Search ............ 359/462, 463, 359/622, 623; 348/54, 59; 352/60, 65; 353/7; 349/57, 95

[56] References Cited

U.S. PATENT DOCUMENTS

| | | | |
|---|---|---|---|
| 3,674,339 | 7/1972 | Sayanagi | 350/130 |
| 4,078,854 | 3/1978 | Yano | 359/727 |
| 4,469,415 | 9/1984 | Radl | 350/517 |
| 4,732,456 | 3/1988 | Fergason et al. | 350/334 |
| 4,756,601 | 7/1988 | Schröder | 350/130 |
| 5,122,650 | 6/1992 | McKinley | 250/208.1 |
| 5,132,839 | 7/1992 | Travis | 359/463 |
| 5,392,140 | 2/1995 | Ezra et al. | 349/95 |

FOREIGN PATENT DOCUMENTS

| | | |
|---|---|---|
| 0063252 | 10/1982 | European Pat. Off. . |
| 0262955 | 4/1988 | European Pat. Off. . |
| 0309630 | 4/1989 | European Pat. Off. . |
| 0354851 | 2/1990 | European Pat. Off. . |
| 0389842 | 10/1990 | European Pat. Off. . |
| 0508824 | 10/1992 | European Pat. Off. . |
| 0570179 | 11/1993 | European Pat. Off. . |
| 0602934 | 6/1994 | European Pat. Off. . |
| 184919 | 2/1937 | France . |
| 2028938 | 12/1971 | Germany . |
| 4004739 | 8/1991 | Germany . |
| 61-113389 | 5/1986 | Japan . |
| 5-83746 | 2/1993 | Japan . |
| 541753 | 12/1941 | United Kingdom . |
| 2206763 | 1/1989 | United Kingdom . |
| 2252175 | 7/1992 | United Kingdom . |
| 0851404 | 10/1996 | United Kingdom . |
| 8302169 | 6/1983 | WIPO . |
| WO88/08146 | 10/1988 | WIPO . |
| WO90/08343 | 7/1990 | WIPO . |
| WO91/10310 | 7/1991 | WIPO . |
| 9319394 | 9/1993 | WIPO . |

OTHER PUBLICATIONS

J.F. Butterfield; "Survey of Three–Dimensional Television"; Proc. SPIE, Optics and Photonics Applied to Three Dimensional Imagery, vol. 212, p. 40, 1979 No Month.

M. Okada et al.; "Electronic Registration for an Autostereoscopic Lenticular 3D TV on a CRT: An Equivalent of a Varifocal Lens for an Electronic 3D Display", First International Symposium on 3D Images, pp. 1–8, Sep. 1991.

Isono et al.; "50 Inch Autostereoscopic Full Colour 3D TV Display System", Proc. SPIE, Stereoscopic Display and Applications III, vol. 1669, pp. 176–185 1992 No Month.

A.R.L. Travis; "The Design and Evaluation of a CTR–Based Autostereoscopic 3D Display", Proc. SID, vol. 32/4, 1991, pp. 279–283 No Month.

(List continued on next page.)

Primary Examiner—Jon W. Henry

[57] ABSTRACT

A 3D projection display comprises an autostereoscopic image producing unit which directs light beams corresponding to respective 2D views in different directions towards a projection lens. The projection lens co-operates with the image producing unit to image the light beams at respective different regions in the aperture of the projection lens. A light-transmissive screen co-operates with the image producing unit and the projection lens to image the views at the screen. The screen may comprise a Fresnel lens, or where a magnified image of increased angular spread is required, a double lenticular screen angular amplifier.

21 Claims, 11 Drawing Sheets

OTHER PUBLICATIONS

M.C. Hutley et al.; "The Formation of Integral Images by Afocal Pairs of Lens Arrays (Superlenses)", 1991 IOP Publlishing Ltd., pp. 147–154 No Month.

R. Börner; "Progress in Projection of Parallax–Panoramagrams Onto Wid–Angle Lenticular Screens", SPIE, True 3D Imaging Techniques and Display Technologies, vol. 761, pp. 35–43, 1987 No Month.

Search Report for European Appl. 93310071.1, mailed Jan. 12, 1995.

Search Report for European Appl. 94308334.5, Mailed Feb. 27, 1995.

THREE-DIMENSIONAL PROJECTION DISPLAY APPARATUS

The present invention relates to a three-dimensional (3D) projection display apparatus.

FIG. 1 of the accompanying drawings shows a known large screen 3D display comprising a plurality of projectors 1, each of which projects an image representing a two-dimensional (2D) view. The output light beams of the projectors 1 are directed to an auto-collimating lenticular array 3. The 2D views are imaged at the array 3 and the light beams from the projectors are directed in different directions by the array 3 such that each eye of an observer 4 sees a different 2D view across the whole of the array 3, thus creating an autostereoscopic 3D image. Similar displays are disclosed in: "Survey of three dimensional television", James F. Butterfield, page 40 Proc. SPIE vol. 212 Optics and Photonics Applied to Three Dimensional Imagery (1979); and "Electronic Registration for an Autostereoscopic Lenticular 3D TV on a CRT: An equivalent of a Varifocal lens for an electronic 3D display", M. Okada, J. Hamasaki, S. Utsunomiya, O. Takeuchi, First International Symposium on 3D Images (Paris 26–28 Sep., 1991).

A display of this type can provide a large 3D image, for instance of about 1 meter diagonal size, but requires a relatively large number of projectors in order to provide an acceptable number of 2D views. Such a display is therefore prohibitively bulky and expensive. Further, without the use of expensive anamorphic correcting optics in the projectors 1, such a display suffers from keystone distortions between the projected images. Alternatively, real time electronic correction for keystone distortions may be necessary.

Another known type of projection 3D display uses a single projector comprising a light source, a spatial light modulator (SLM), and a projection lens. A plurality of spatially multiplexed 2D views is formed by the SLM and projected via the projection lens on to a lenticular screen. However, in order to provide a large display with an adequate number of 2D views, the SLM is required to provide a spatially multiplexed image having a resolution which is greater than can be provided by currently available devices. Further, very accurate control of registration of the images with respect to the lenticular screen is required which, in turn, requires a very well corrected projection lens. A similar type of system is disclosed in "50 inch autostereoscopic full colour 3D TV display system", Isono, Yasuda, Takemori, Kanayama, Yamada & Chiba, page 176 Proc. SPIE vol. 1669 Stereoscopic Displays and Applications III (1992).

Figure 2:
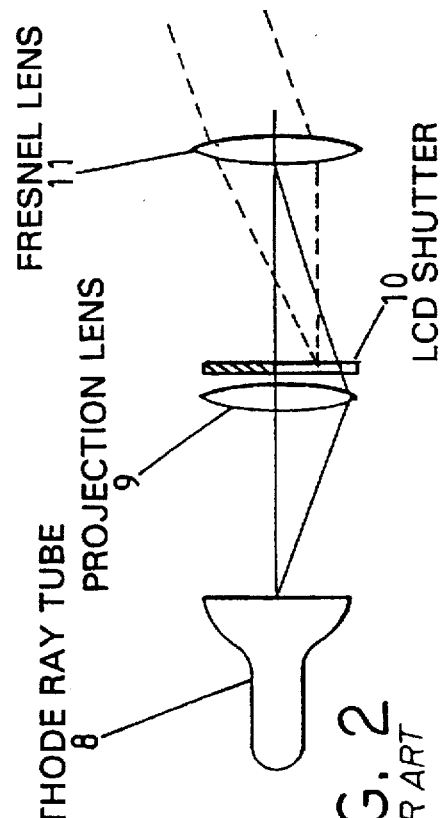

FIG. 2 of the accompanying drawings shows another known type of 3D autostereoscopic projection display comprising a cathode ray tube 8, a projection lens 9, a liquid crystal display (LCD) shutter 10, and a Fresnel lens 11. "The Design and Evaluation of a CRT based Autostereoscopic 3D Display", A. R. L. Travis, S. R. Lang, Proc. SID vol. 32/4, 1991. A temporally multiplexed image is provided on the screen of the cathode ray tube 8 and is imaged by projection lens 9 via the LCD shutter 10 on to the surface of the Fresnel lens 11. The temporally multiplexed image comprises a plurality of 2D views displayed in sequence on the screen of the tube 8. The shutter 10 provides a plurality of laterally displaced and sequentially transparent regions for controlling the directions in which the 2D views are visible to an observer. The shutter 10 is disposed as close to the projection lens 9 as possible and in the focal plane of the Fresnel lens 11, so that collimated light is imaged from each point in the shutter plane by the lens 11. However, this type of display is capable of providing only a limited size of image and a limited field of view.

GB 851 404 discloses a stereo viewer in which an optical system is provided for permitting two transparencies carrying left-eye and right-eye views to be seen by the left and right eyes, respectively, of an observer. Various techniques are described for enabling the left and right images corresponding to the left and right views to overlap at an image plane formed by a field lens. One such technique involves the use of a lens to control the overlapping of the images.

EP-A-0 309 630 discloses an arrangement in which the images from two halves of an object are imaged via different optical paths into one eye of an observer.

WO 88/08146 discloses an arrangement in which several display elements are imaged by an optical system to produce real intermediate images. A magnifying lens produces a real image of field diaphragms in the field of vision of an observer.

U.S. Pat. No. 4,756,601 discloses a display in which images from a pair of cathode ray tubes are focused by lenses to form real images at a plane intermediate the lenses and a mirror. The images are then projected towards an observer by a common optical system comprising a concave mirror and a lens.

According to the invention, there is provided a 3D projection display apparatus as defined in the appended claim 1.

Preferred embodiments of the invention are defined in the other appended claims.

It is thus possible to provide a 3D projection display apparatus which is capable of providing full colour or monochrome still or moving autostereoscopic images having a relatively large size and with an adequate number of views to provide an acceptable 3D image. Such an apparatus may be used for 3D television, 3D computer aided design and graphics, 3D medical imaging, virtual reality, and computer games. Also, such a display may be used to provide projection of hard copy from a computer peripheral full colour 3D printer. It is further possible to increase the image size of the 3D display while maintaining the required angular separation of the output views of the apparatus. This may be achieved with a single relatively low aperture projection lens.

It is also possible to provide a large size 3D display with a large field of view using a single projection lens of relatively small output numerical aperture. Such a display does not require an optical shutter. The use of a single lens to project an autostereoscopic display reduces the cost, complexity, and ease of alignment of the optical system. The lower complexity compared with equivalent known systems makes the present invention more suitable for the projection of a larger number of views, thus improving the quality of the 3D display obtained.

Where an angular amplifying screen is provided, a larger degree of freedom of movement of the observer is permitted. This allows several observers to view the 3D image. Also, the display may be readily adapted to track the position of at least one observer so as to allow an even greater degree of movement while still being able to see an autostereoscopic 3D image.

As mentioned hereinbefore, known projection displays may suffer from keystone distortions or other image distortions in the plane of the screen. In the absence of expensive anamorphic correcting optics or complex electronic correction of images, keystone distortion may be at least partially corrected by offsetting SLMs with respect to the axes of the projection lenses, for instance in systems of the type shown in FIG. 1. Such offsetting causes a reduction in the image quality. However, such problems are avoided with the present invention because there is no need for keystone distortion correction.

The present invention will be further described, by way of example, with reference to the accompanying drawings, in which:

FIGS. 1 and 2 illustrate respective known types of projection autostereoscopic 3D displays; and FIGS. 3 to 12 are diagrammatic cross-sectional views of 3D displays constituting a first to ninth embodiments, respectively, of the invention.

Figure 3:
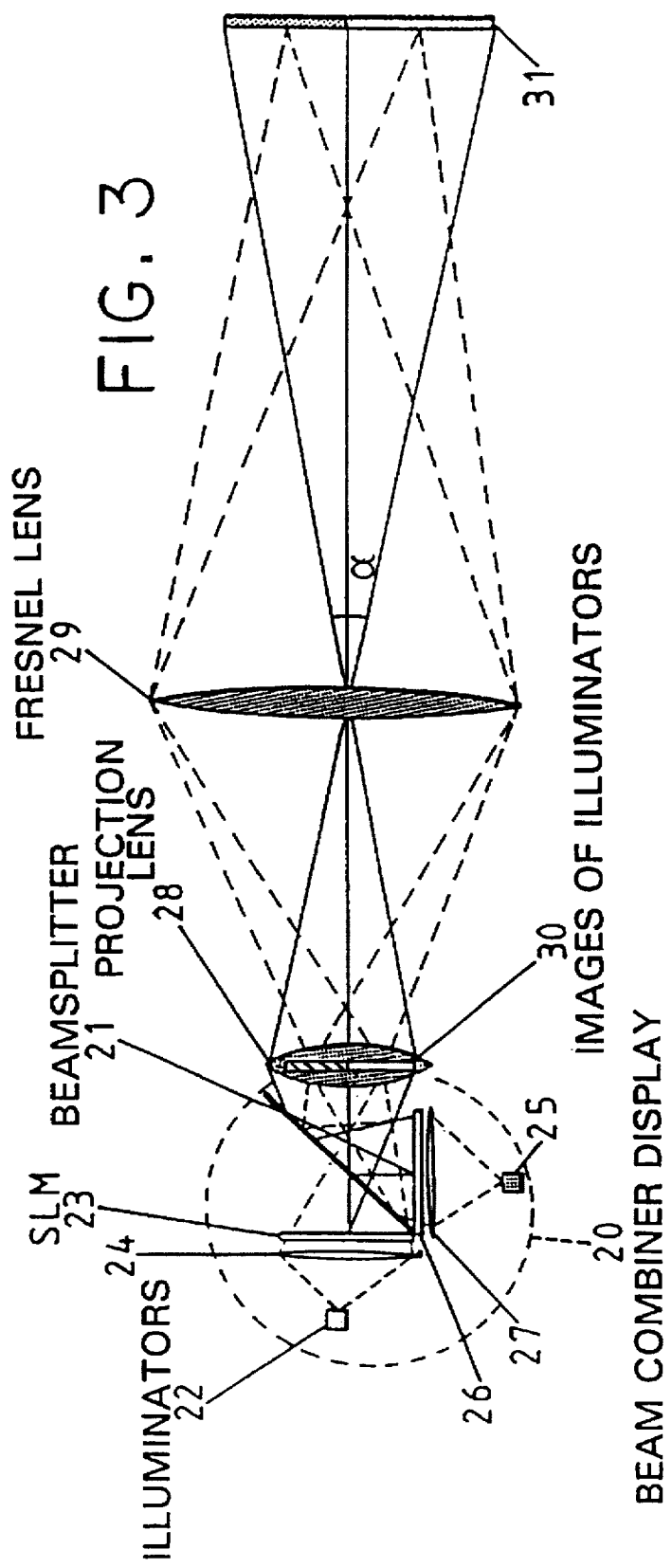

The 3D autostereoscopic display shown in FIG. 3 comprises a beam combiner display 20 in which 2D views are combined by means of a beam splitter 21. One or more illuminators 22 illuminate a SLM 23 via a lens 24 to provide one or more 2D views which are transmitted through the beam splitter 21. Similarly, one or more illuminators 25 illuminate a SLM 26 via a lens 27 to supply one or more 2D views which are reflected by the beam splitter 21 in such a way that the view provided by the SLMs 23 and 26 are spatially multiplexed. For the purposes of illustration in FIG. 3, a single illuminator 22 and a single illuminator 25 are shown.

The output light beams from the beam combiner display 20 are imaged by a projection lens 28 and supplied to an output screen in the form of a fresnel lens 29. Two imaging processes take place in the display. In accordance with the first imaging process, each of the illuminators 22 and 25 is imaged into a separate position, shown at 30, in the aperture of the projection lens 28. The images of the illuminators are re-imaged by the Fresnel lens 29 to form an image 31 of the illuminators at an observer located at a defined image distance from the Fresnel lens 29.

In accordance with the second imaging process, the 2D images formed on the SLMs 23 and 26 are imaged by the projection lens 28 onto a front surface of the Fresnel lens 29. Thus, a different 2D view will be seen by the eyes of an observer when located at the images 31 of the illuminators 22 and 25. The image will appear in the plane of the Fresnel lens 29.

By imaging the illuminators at different positions in the aperture of the projection lens 28, the need for a shutter is eliminated, thus simplifying the display compared, for instance, with the display shown in FIG. 2. A relatively large displayed image can be provided utilising SLMs of readily available type with acceptable resolution. Although FIG. 3 illustrates a display in which only two 2D views are provided to form the 3D image, additional views can readily be provided. For instance, further beam splitters may be provided with additional illuminators, lenses, and SLMs. Alternatively, as mentioned hereinbefore, several illuminators may be provided for each SLM with the illuminators being illuminated one at a time and supplying light in respective different directions, with different 2D views being provided in sequence by each SLM, so as to provide temporal multiplexing of the 2D views. Beam combiner displays of this type are, for instance, disclosed in EP-A-0 602 934 based on British Patent Application No. 9226272.4.

Using the Fresnel lens 29 as the output screen of the display, the angular spread of views is limited by the output numerical aperture of the projection lens 28. If a large magnification of the images produced by the SLMs is required, then the output numerical aperture has to be reduced, thus limiting the range of angles available. It is generally impractical to use very large projection lenses of sufficient imaging quality because of the expense.

To illustrate the problem, if the LCD size is 50 millimeters, with a 5:1 magnification by a 80 millimeter focal length projection lens of aperture f/1.9, then the image distance of the projection lens is 480 millimeters and the output numerical aperture $\alpha/2$ is 2.5 degrees. For four 2D views and a separation of the views at the observer of 65 millimeters, the observer will see a 3D image of size 250 millimeters at a distance of approximately 3,000 millimeters from the screen. This would be an unacceptable viewing distance for this image size.

Figure 4:
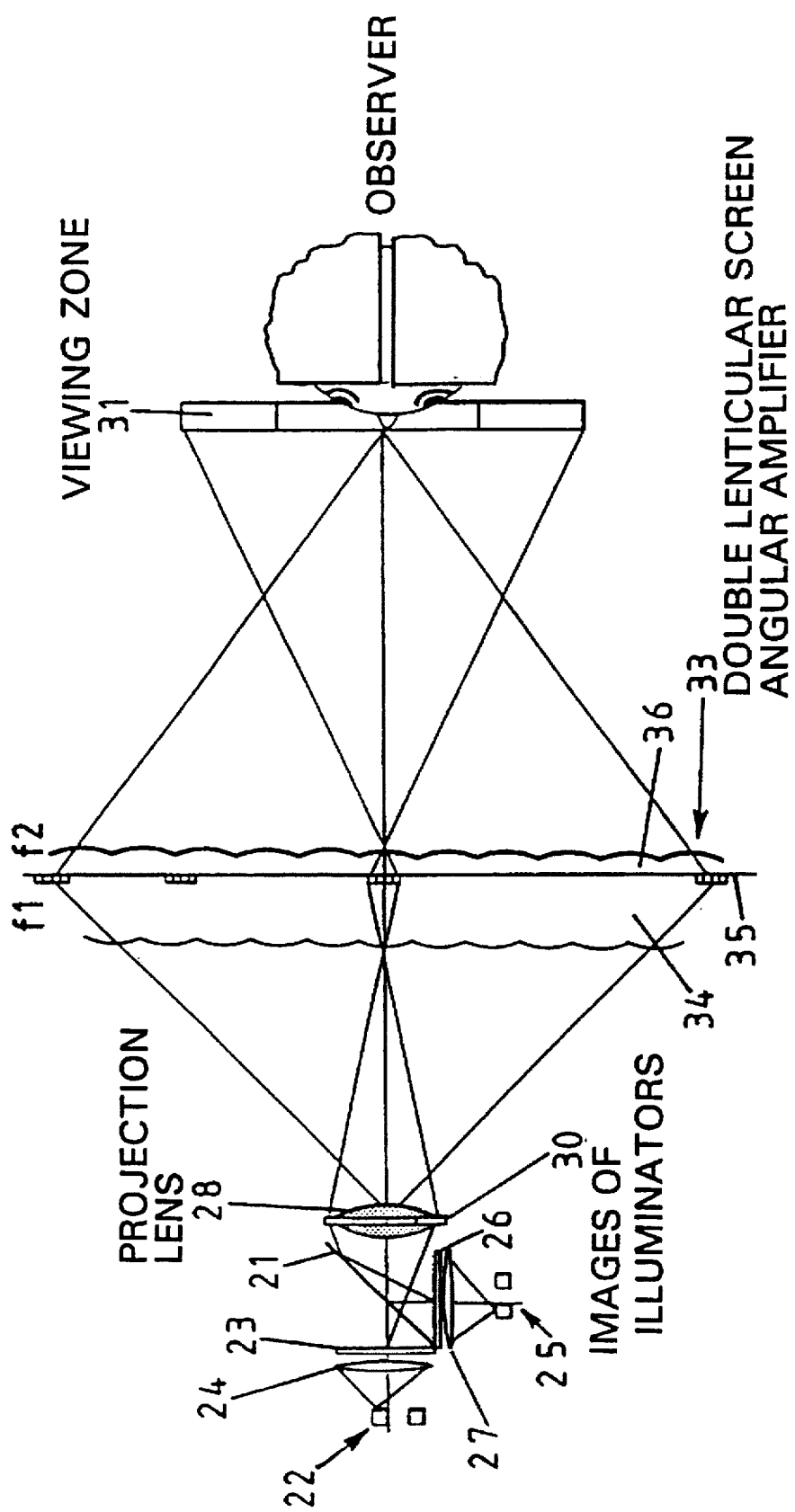

The 3D display shown in FIG. 4 overcomes this problem by using a double lenticular screen angular amplifier 33 as the output screen in place of the Fresnel lens 29. Also, the beam combiner display is shown as having two illuminators 22 and two illuminators 25 for providing four 2D views.

The double lenticular screen angular amplifier 33 is of a similar type to an arrangement disclosed in GB 541 753 and by Hurley and Stevens in an article entitled "The formation of Integral Images by Afocal Pairs of Lens Arrays ("Super-Lenses")", page 147 IOP Short Meetings No. 30, 1st May, 1992. The angular amplifier 33 comprises a first lenticular array 34 having a focal length f1 arranged to image each of the illuminators 22 and 25 at a plane diffuser 35. The images are re-imaged by a second lenticular array 36 having a focal length f2 which is less than f1. The shorter focal length of the second lenticular array results in the angular spread of the views being increased, so that the separation of the 2D views at the observer is increased and a reasonable angular spread is obtained. The aperture of the projections lens 28 may therefore be reduced while maintaining the appropriate separation of views at the observer.

Continuing the previously described numerical example, the output numerical aperture of the projection lens 28 in FIG. 4 may be 2.5 degrees. For an observer distance from the screen of 1,000 millimeters and with four views with a spacing between adjacent views of 65 millimeters, a total output angular spread from the angular amplifier 33 of 15 degrees is required. A lenticular screen having a ratio f1:f2 of focal lengths equal to approximately 3:1 and with the lenses having substantially the same pitch would achieve this. For instance, f1 may be 5.7 millimeters and f2 may be 1.9 millimeters. The size of the image of the lens aperture behind each lenticular element (assuming a refractive index of 1.5) is approximately 0.5 millimeters, which defines the minimum lenticular pitch. The pixel sizes for a 500×500 pixel display at the 250 millimeter image projected on to the angular element 33 is 0.5 millimeters. Thus, it is possible to provide a 3D display of large size providing a large magnification and large angular spread of 2D views.

Another advantage provided by the use of the angular amplifier 33 is that a relatively large central lobe i.e. subtending a relatively large angle at the angular amplifier 33, is provided, thus allowing greater freedom of movement of the observer. In addition, the illuminators 22 and 25 may be made laterally movable and means provided for tracking the position of one or more observers. The large central lobe provides the possibility of more than one observer being able to view the display and the provision of observer tracking facilities may allow even greater freedom of movement.

Figure 5:
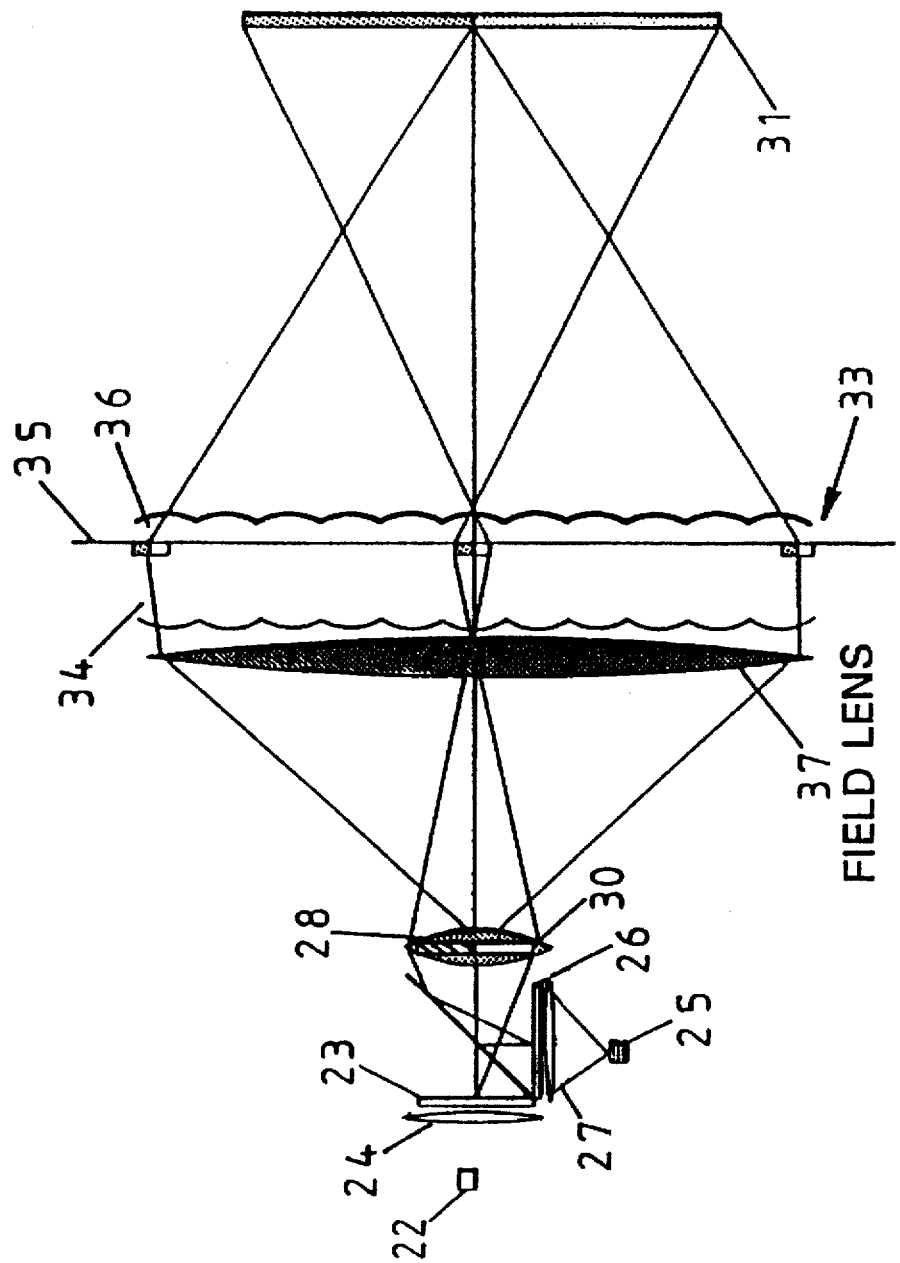

The 3D display shown in FIG. 5 differs from that shown in FIG. 4 in that a field lens 37 of the Fresnel type is provided adjacent the angular amplifier 33 on the side thereof facing the projection lens 28. The field lens 37 is arranged to image the ray bundles in the appropriate directions on to the angular amplifier 33 such that, for each particular source, a single image is generated by the angular amplifying screen at the observer plane. Although such an arrangement may be provided without a field lens by controlling the relative pitch of the lenticular screens 34 and 36, the manufacturing tolerances required to achieve this are very tight. The same result can be achieved with the Fresnel field lens 37 with the position and focal length thereof suitably adjusted and such an arrangement requires lower manufacturing tolerances.

Figure 6:
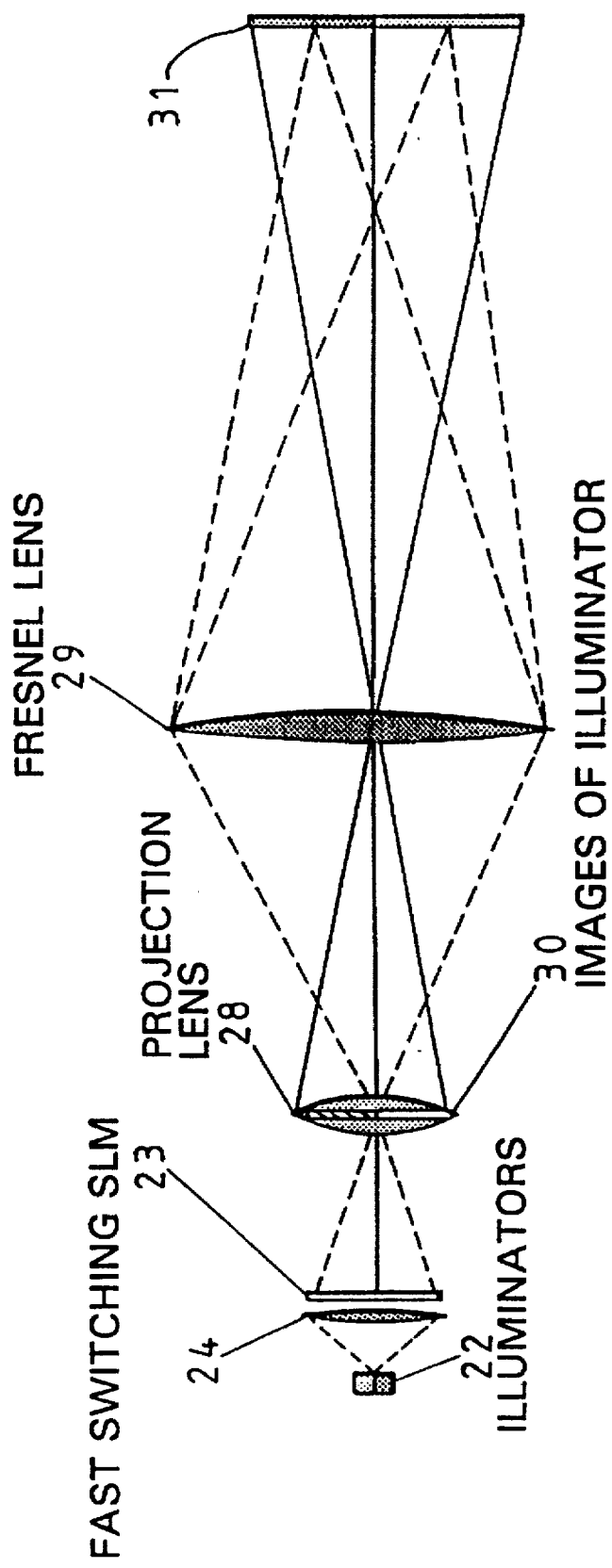

The display shown in FIG. 6 differs from that shown in FIG. 4 in that the beam combiner display 20 is replaced by a temporally multiplexed display. The temporally multiplexed display comprises contiguous illuminators 22 which illuminate a fast switching SLM 23 via a lens 24 to provide two temporally multiplexed 2D views. First and second 2D views are alternately displayed by the SLM 23 in synchronism with illumination of first and second of the illuminators, respectively.

Figure 7:
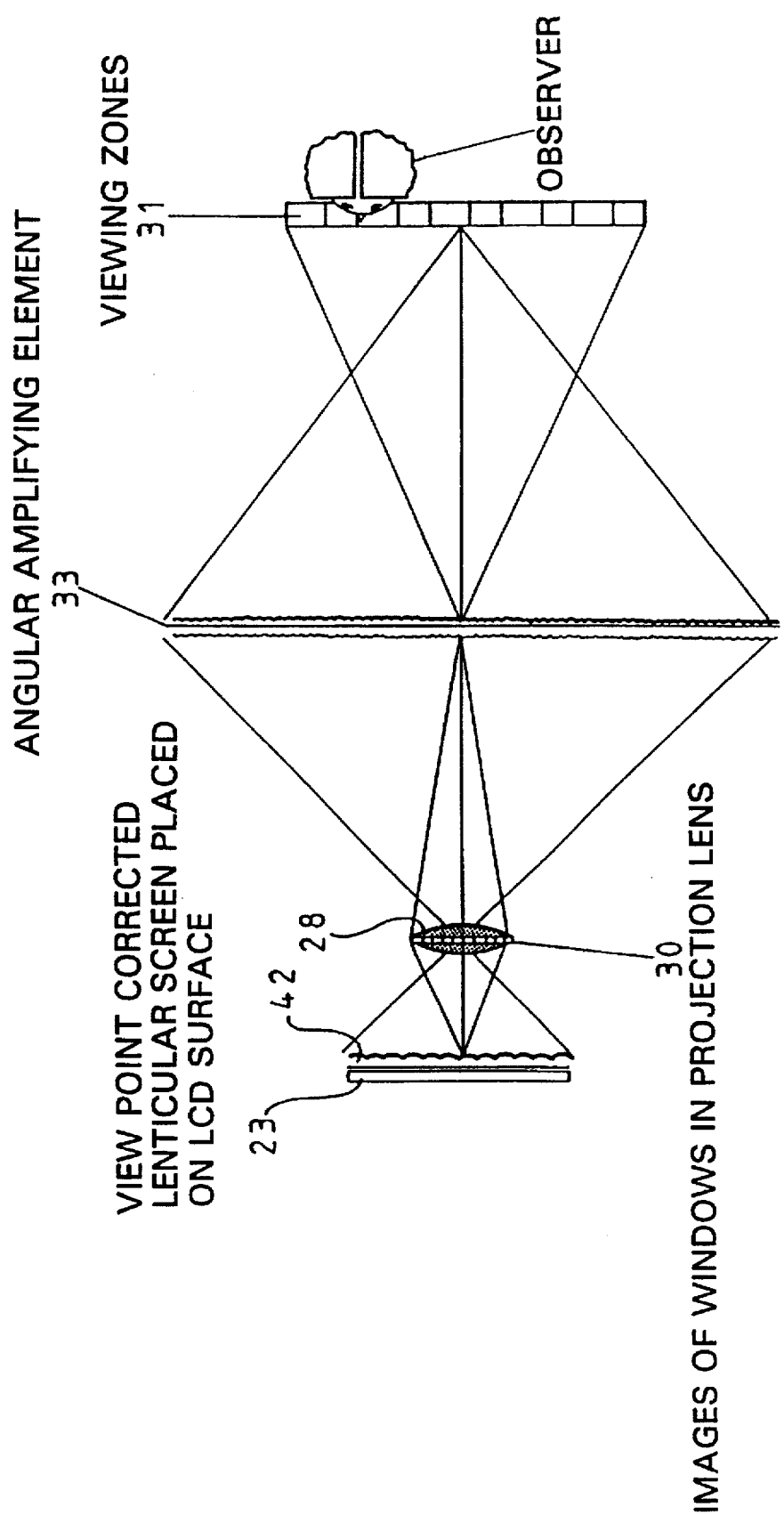

The display shown in FIG. 7 differs from that shown in FIG. 4 in that the beam combiner display is replaced by a spatially multiplexed display. The spatially multiplexed display comprises a viewpoint corrected lenticular screen 42 disposed on the surface of a SLM 23 in the form of a liquid crystal device (LCD). The LCD displays spatially multiplexed 2D images such that strips of the images are interlaced in groups with each group aligned with a respective lenticule of the screen 42. The LCD 23 is suitably illuminated, for instance by a diffuse light source (not shown).

Figure 8:
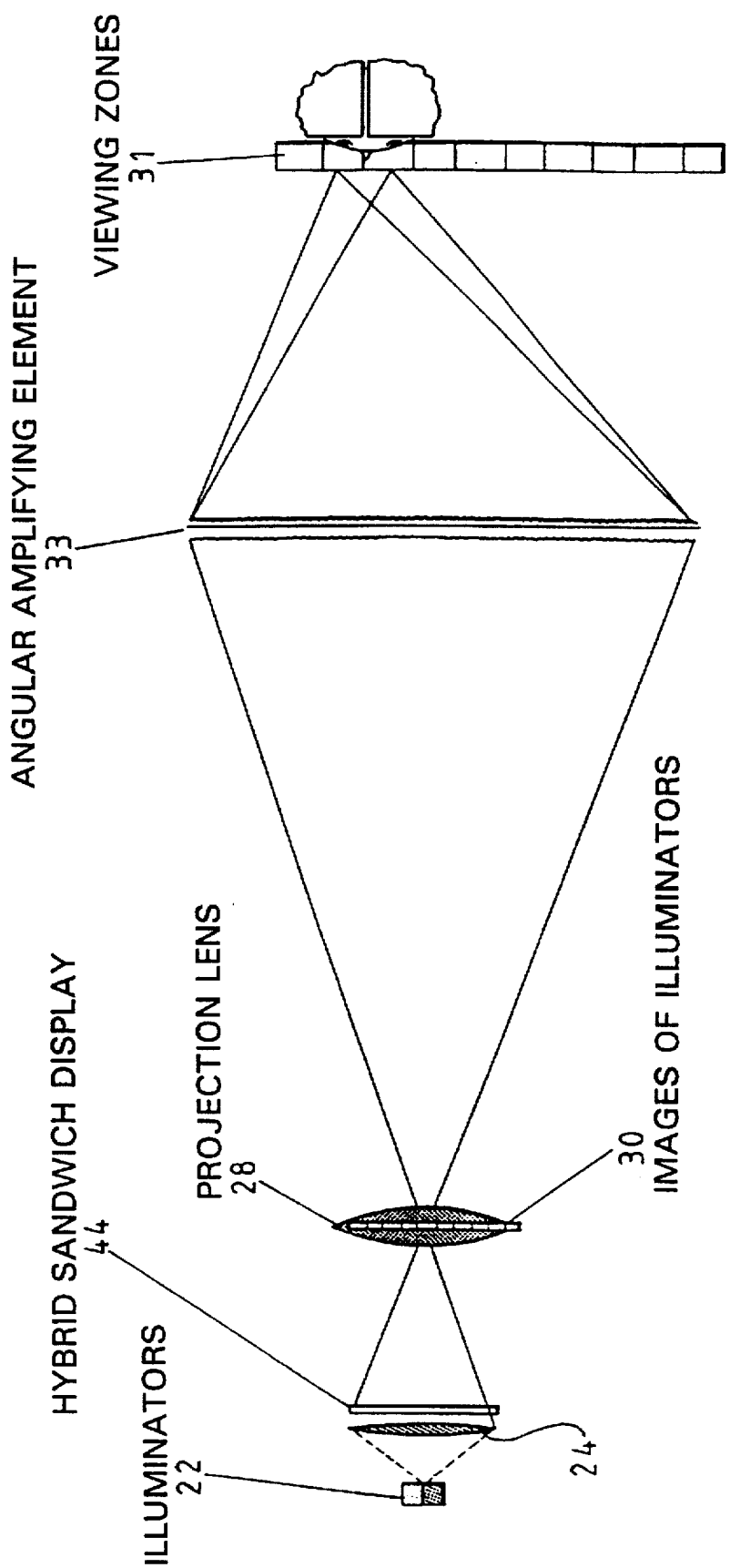

The display shown in FIG. 8 differs from that shown in FIG. 4 in that the beam combiner display is replaced by illuminators 22, a lens 24, and a hybrid sandwich display 44. The display 44 is of the type disclosed in European Patent Application No. 93303590.9 published as EP-A-0 570 179 and for instance comprises an input lenticular screen, an SLM, a diffuser, and an output lenticular screen. The display 44 provides both spatially and temporally multiplexed 2D views.

Figure 9:
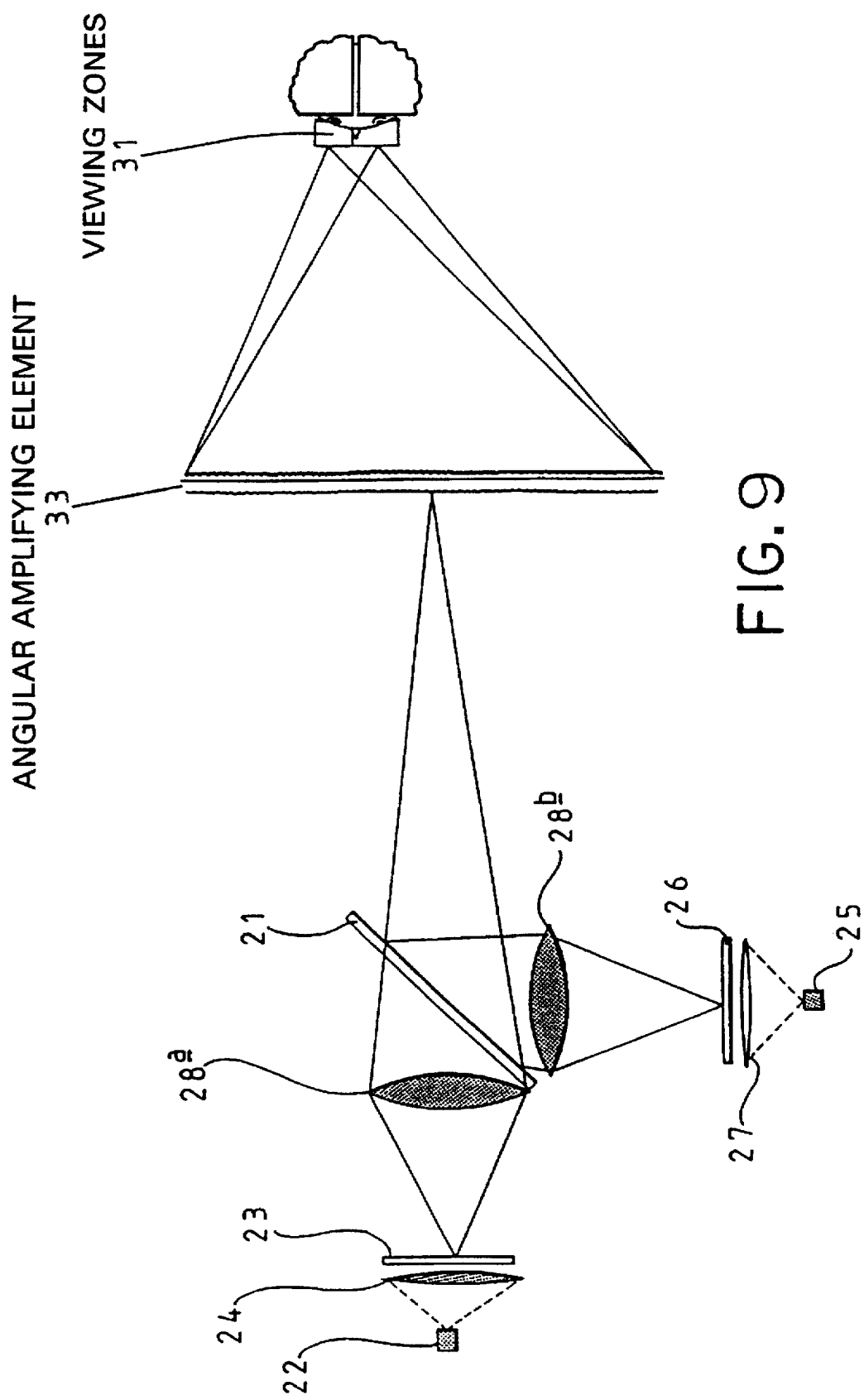

The display shown in FIG. 9 differs from that shown in FIG. 3 in that the fresnel lens 29 is replaced by an angular amplifier 33 and the projection lens 28 is replaced by first and second projection lenses 28a and 28b. The lens 28a is disposed between the beam splitter 21 and the SLM 23 whereas the lens 28b is disposed between the beam splitter 21 and the SLM 26.

Figure 10:
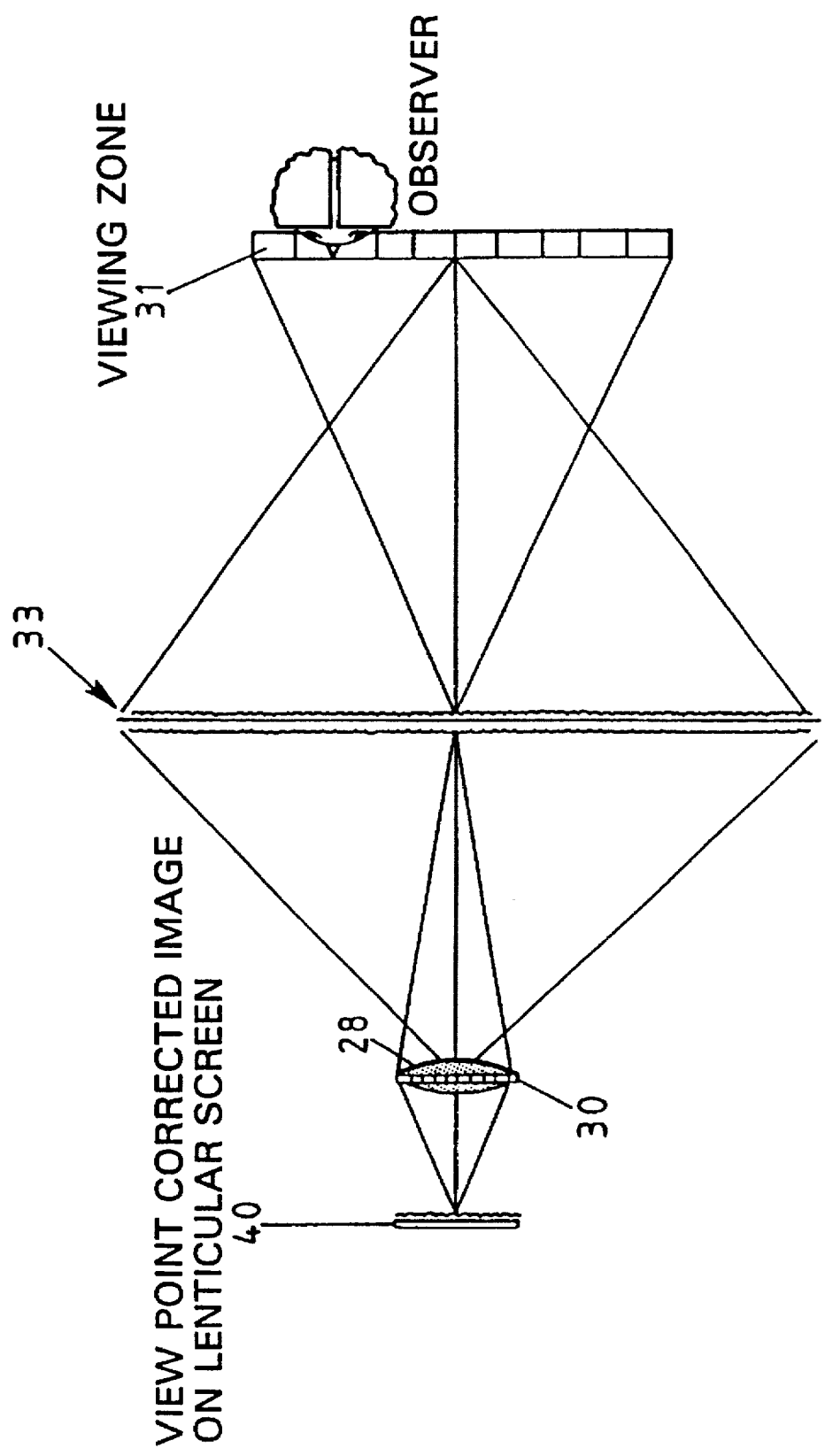

As shown in FIG. 10, the projection display may be used to project a printed image. The printed image comprises a lenticular screen 40 on which is printed a view point corrected image comprising spatial multiplexed 2D views, for instance produced by means of the techniques disclosed in GB 9222346.0 and EP-A-0 596 629 (EP 93308447.7). By suitably illuminating from the back or the front the lenticular screen 40, the image is projected on to the angular amplifier 33.

Figure 11:
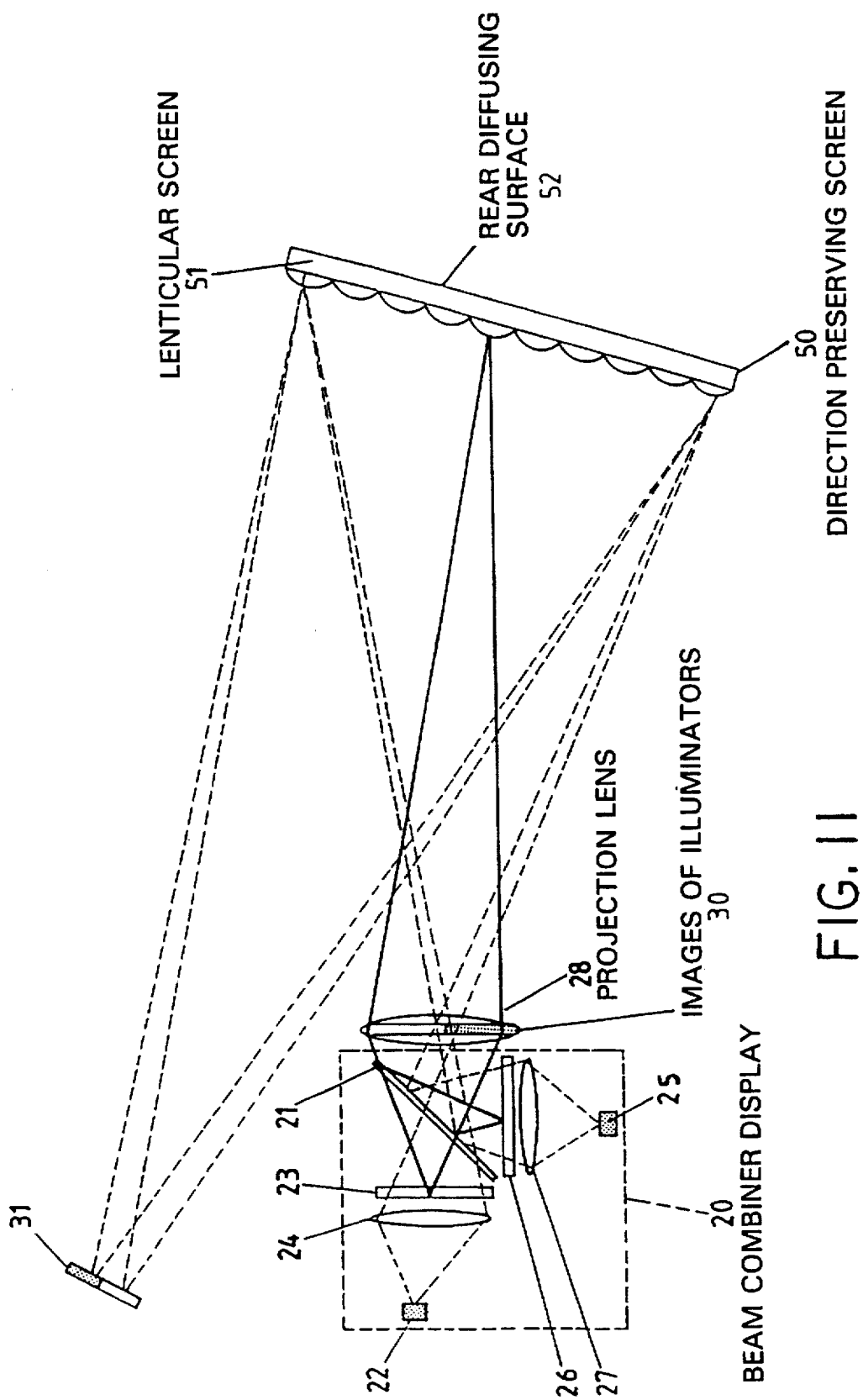

The projection display shown in FIG. 11 comprises a beam combiner display 20 and projection lens 28 which are of the type shown in FIG. 3 and which will not be described further. The display of FIG. 11 differs from the previous displays in that the light transmitting screens in the forms of the Fresnel 29 and angular amplifier 33 are replaced by a reflective arrangement in the form of a direction preserving screen 50. The screen 50 comprises a lenticular screen 51 having a rear diffusing surface 52. The beam combiner display 20 may be replaced by any other suitable type of display, such as one of the types shown in the other drawings.

In use, the beam combiner display 20 images into a higher order lobe of the lenticular screen 51 with observation in the zeroth lobe. However, other modes may be used.

For instance, the beam combiner display 20 and the projection lens 28 may be disposed above the viewing zone 31 so that vertical diffusion at the diffusing surface 52 allows observation of the 3D image.

The direction preserving screen 50 may be flat or curved as described by R. Borner, "Progress in Projection of Parallax Panoramagrams onto Wide Angle Lenticular Screens", page 35, SPIE vol. 761 "True 3D Imaging Techniques and Display Technologies" (1987). The use of the beam combiner display 20 can simplify reflective mode projection displays by replacing the plurality of projectors used in known systems and hence reducing problems with "keystone" distortion.

Figure 12:
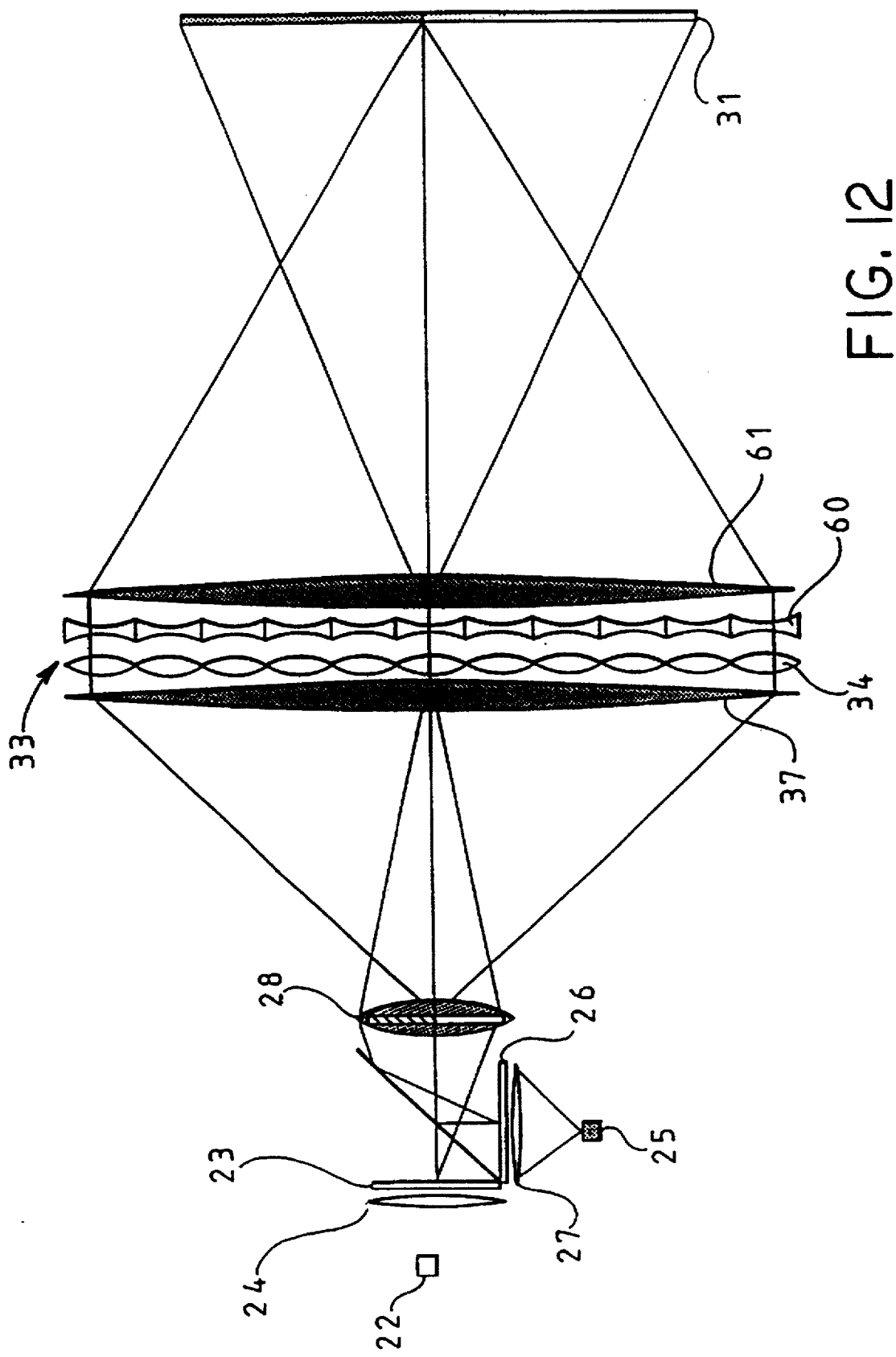

The display shown in FIG. 13 differs from that shown in FIG. 5 in that the diffuser 35 is omitted, the lenticular screen 36 is replaced by a lenticular screen 60 comprising optically diverging elements, and a further field correction lens 61 is provided on the opposite side of the angular amplifying screen 33 from the first field correction lens 37. Although two field correction lenses 37 and 61 are shown in FIG. 12, it is possible to use a single field correction element, such as a single lens. Each lens of the screen 34 cooperates with the corresponding lens of the screen 60 to form a Galilean telescope, so that the angular amplifier 33 shown in FIG. 12 effectively functions in the same way as the angular amplifier 33 of FIG. 5.

The image plane of the lenticular screen 34 coincides with the object plane of the lenticular screen 60, these coincident planes being disposed to the right of the screen 60 in FIG. 12. Thus, the focal length of the diverging lenses of the screen 60 is less than the focal length of the converging lenses of the screen 34.

What is claimed is:

1. A three-dimensional projection display apparatus, comprising autostereoscopic image producing means for directing light beams corresponding to respective views in different directions, further comprising at least one projection lens co-operating with the autostereoscopic image producing means to image the light beams at respective different regions in the aperture of the projection lens, and a light-transmissive or light-reflective screen co-operating with the autostereoscopic image producing means and the projection lens to image the views at the screen.

2. An apparatus as claimed in claim 1, wherein the screen comprises a converging lens.

3. An apparatus as claimed in claim 2, wherein the converging lens is a Fresnel lens.

4. An apparatus as claimed in claim 1, wherein the screen comprises: a diffuser; a first array of converging lenses disposed on a first side of the diffuser for receiving light from the at least one projection lens; and a second array of converging lenses disposed on a second side of the diffuser, the converging lenses of the second array having a focal length less than that of the converging lenses of the first array.

5. An apparatus as claimed in claim 1, wherein the screen comprises: a first array of converging lenses for receiving light from the at least one projection lens; a second array of diverging lenses having a focal length less than that of the converging lenses of the first array; and a field correction element.

6. An apparatus as claimed in claim 4, wherein each of the first and second arrays comprises a lenticular screen comprising cylindrical lenticules.

7. An apparatus as claimed in claim 5, wherein each of the first and second arrays comprises a lenticular screen comprising cylindrical lenticules.

8. An apparatus as claimed in claim 4, wherein a field lens is disposed between the projection lens and the first array.

9. An apparatus as claimed in claim 8, wherein the field lens is a Fresnel lens.

10. An apparatus as claimed in claim 1, wherein the screen comprises a direction-preserving lenticular screen having a rear diffusing surface.

11. An apparatus as claimed in claim 1, wherein the autostereoscopic image producing means comprises at least one spatial light modulator and a plurality of light sources arranged such that the light sources are imaged at the respective different regions in the aperture of the projection lens and the at least one spatial light modulator is imaged at the screen.

12. An apparatus as claimed in claim 11, in which the autostereoscopic image producing means comprises a beam combiner co-operating with first and second display means.

13. An apparatus as claimed in claim 12, wherein the at least one projection lens comprises first and second projection lenses disposed between the beam combiner and the first and second display means, respectively.

14. An apparatus as claimed in claim 12, wherein each of the first and second display means comprises a spatial light modulator and at least one light source.

15. An apparatus as claimed in claim 13, wherein each of the first and second display means comprises a spatial light modulator and at least one light source.

16. An apparatus as claimed in claim 11, wherein the at least one spatial light modulator is arranged to display temporally multiplexed 2D views and the plurality of light sources are arranged to illuminate the at least one respective spatial light modulator in respective different directions corresponding to the 2D views.

17. An apparatus as claimed in claim 11, wherein the at least one spatial light modulator is arranged to display spatially multiplexed 2D views and co-operates with a respective parallax screen.

18. An apparatus as claimed in claim 17, wherein the parallax screen comprises a lenticular screen.

19. An apparatus as claimed in claim 11, wherein the at least one spatial light modulator is disposed between an input lenticular screen and an output lenticular screen whose pitch is greater than that of the input lenticular screen.

20. An apparatus as claimed in claim 1, wherein the autostereoscopic image producing means comprises a substrate carrying a spatially multiplexed image of the views and a lenticular screen.

21. An apparatus as claimed in claim 20, in which the lenticular screen is the substrate.

* * * * *